(12) United States Patent
Cao et al.

(10) Patent No.: US 9,367,961 B2
(45) Date of Patent: Jun. 14, 2016

(54) METHOD, DEVICE AND STORAGE MEDIUM FOR IMPLEMENTING AUGMENTED REALITY

(71) Applicant: TENCENT TECHNOLOGY (SHENZHEN) COMPANY LIMITED, Shenzhen, Guangdong Province (CN)

(72) Inventors: Chen Cao, Shenzhen (CN); Xin-Yu Cui, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 218 days.

(21) Appl. No.: 14/203,528

(22) Filed: Mar. 10, 2014

(65) Prior Publication Data

US 2014/0306996 A1 Oct. 16, 2014

Related U.S. Application Data

(63) Continuation of application No. PCT/CN2013/091048, filed on Dec. 31, 2013.

(30) Foreign Application Priority Data

Apr. 15, 2013 (CN) .......................... 2013 1 0129360

(51) Int. Cl.
*G09G 5/00* (2006.01)
*G06T 19/00* (2011.01)
*G01C 21/36* (2006.01)

(52) U.S. Cl.
CPC .......... *G06T 19/006* (2013.01); *G01C 21/3682* (2013.01)

(58) Field of Classification Search
None
See application file for complete search history.

(56) References Cited

U.S. PATENT DOCUMENTS

| 2006/0262140 A1* | 11/2006 | Kujawa | G06T 7/0044 345/633 |
| 2012/0105474 A1* | 5/2012 | Cudalbu | H04W 4/02 345/633 |
| 2013/0314438 A1* | 11/2013 | Borcherdt | G06T 11/00 345/629 |
| 2014/0043322 A1* | 2/2014 | Fulks | G06T 19/006 345/419 |

FOREIGN PATENT DOCUMENTS

WO PCT/CN2013/091048 12/2013

* cited by examiner

*Primary Examiner* — Yingchun He
(74) *Attorney, Agent, or Firm* — Cheng-Ju Chiang

(57) ABSTRACT

The present disclosure relates to a method, a device and a storage medium for implementing augmented reality. The method includes: obtaining a real scene, and according to shooting position and shooting direction of the real scene, obtaining POIs within a preset area and POI information corresponding to the POIs, the POI information comprising position information of the corresponding POI; creating a virtual plane, and mapping position relationship between the POIs on the virtual plane, and inserting tags of POI information to the location of the corresponding POI on the virtual plane; superimposing the virtual plane having the tags of POI information onto the real scene to form an augmented reality view; and displaying the augmented reality view, and adjusting the virtual plane according to real-time information of the real scene, to make the virtual plane be visually parallel to the horizontal plane of the real scene.

12 Claims, 6 Drawing Sheets

METHOD, DEVICE AND STORAGE MEDIUM FOR IMPLEMENTING AUGMENTED REALITY

CROSS-REFERENCE

This application is a U.S. continuation application under 35 U.S.C. §111(a) claiming priority under 35 U.S.C. §120 and §365(c) to International Application No. PCT/CN2013/091048 filed Dec. 31, 2013, which claims the priority benefit of Chinese Patent Application No. 201310129360.7, filed on Apr. 15, 2013, the contents of which are incorporated by reference herein in their entirety for all intended purposes.

FIELD OF THE INVENTION

The present disclosure relates to computer technology, particularly relates to a method, a device and a storage medium for implementing augmented reality.

BACKGROUND OF THE INVENTION

In recent years, with the rapid development of intelligent terminals and mobile internet technology, augmented reality technology (abbreviated as AR) is known to the public. A large number of AR applications based on image-processing and terminal positioning technology have begun to emerge, which caused a greater concern in the industry, and becomes a technology research hotspot.

In researching and application of AR technology, virtual AR information is applied to the real world. The traditional WEB page browsing query mode based on text input changes into a new mode based on camera shooting, hotspots capturing and AR information viewing real-time.

When users of AR terminals (for example, smart phones) shoot surrounding scenery, they can get AR experience at the same time. In a typical business scene, when an AR application running on the user's mobile terminal captures AR targets deployed by AR service providers, based on the user's current location, the AR application can get the AR content corresponding with the AR target and according to the user's choice. The AR target, for example, includes the target point of interest to the user, i.e. the point of interests (POI). The AR content includes text, images, audio, video, and so on. The AR application displays virtual information captured by the imaging apparatus of the user's mobile terminal and AR content in a tag form, on the terminal's screen, and presents AR views to the users. The AR view is an observation view, formed by AR content and real time recording with the imaging apparatus, displayed and rendered on the mobile terminal's screen.

However, in the existing AR technology, the tags corresponding with POIs in the AR view often overlap each other, so that the users cannot determine the location relationship between the POIs.

SUMMARY OF THE INVENTION

The present disclosure is to provide a method, a device and a storage medium for implementing augmented reality, electronic terminal to solve the problem mentioned above.

Technical solutions provided by embodiments of the present disclosure include:

A method for implementing augmented reality electronic terminal includes: obtaining a real scene, and according to shooting position and shooting direction of the real scene, obtaining POIs within a preset area and POI information corresponding to the POIs, the POI information comprising position information of the corresponding POI; creating a virtual plane, and mapping position relationship between the POIs on the virtual plane, and inserting tags of POI information to the location of the corresponding POI on the virtual plane; superimposing the virtual plane having the tags of POI information onto the real scene to form an augmented reality view; and displaying the augmented reality view, and adjusting the virtual plane according to real-time information of the real scene, to make the virtual plane be visually parallel to the horizontal plane of the real scene electronic terminal.

A device for implementing augmented reality, the device comprises at least a processor operating in conjunction with a memory and a plurality of modules, the plurality of modules includes: a real scene obtaining module, configured to obtain a real scene; a POI obtaining module, configured to obtain POIs within a preset area and POI information corresponding to the POIs according to shooting position and shooting direction of the real scene, the POI information comprising position information of the corresponding POI; a virtual plane creating module, configured to create a virtual plane, and map position relationship between the POIs on the virtual plane, and insert tags of POI information to the location of the corresponding POI on the virtual plane; a superimposing module, configured to superimpose the virtual plane having the tags of POI information onto the real scene to form an augmented reality view; and a displaying and adjusting module, configured to display the augmented reality view, and adjust the virtual plane according to real-time information of the real scene, to make the virtual plane be visually parallel to the horizontal plane of the real scene.

A computer-readable storage medium storing instructions for implementing augmented reality, the instructions includes: obtaining a real scene, and according to shooting position and shooting direction of the real scene, obtaining POIs within a preset area and POI information corresponding to the POIs, the POI information comprising position information of the corresponding POI; creating a virtual plane, and mapping position relationship between the POIs on the virtual plane, and inserting tags of POI information to the location of the corresponding POI on the virtual plane; superimposing the virtual plane having the tags of POI information onto the real scene to form an augmented reality view; and displaying the augmented reality view, and adjusting the virtual plane according to real-time information of the real scene, to make the virtual plane be visually parallel to the horizontal plane of the real scene.

In accordance with the embodiments, the electronic terminal creates a virtual plane, maps position relationship between the POIs on the virtual plane, inserts tags of POI information to the location of the corresponding POI on the virtual plane. Then the electronic terminal superimposes the virtual plane having the tags of POI information onto the real scene to form an augmented reality view, displays the augmented reality view, and adjusts the virtual plane according to real-time information of the real scene, to make the virtual plane be visually parallel to the horizontal plane of the real scene. Therefore, the tags of POI information in the augmented reality view final presented to the users have more dimensional sense and more sense of hierarchy, show the distance between the POIs and relative position relationship between the POI and uses intuitively, and improves the efficiency of the application of augmented reality.

Other features and advantages of the present disclosure will immediately be recognized by persons of ordinary skill in the art with reference to the attached drawings and detailed description of exemplary embodiments as given below.

DETAILED DESCRIPTION OF PREFERRED EMBODIMENTS

Various embodiments of the disclosure are discussed in detail below. While specific implementations are discussed, it should be understood that this is done for illustration purposes only. A person skilled in the art will recognize that other components and configurations may be used without parting from the spirit and scope of the disclosure.

Figure 1:
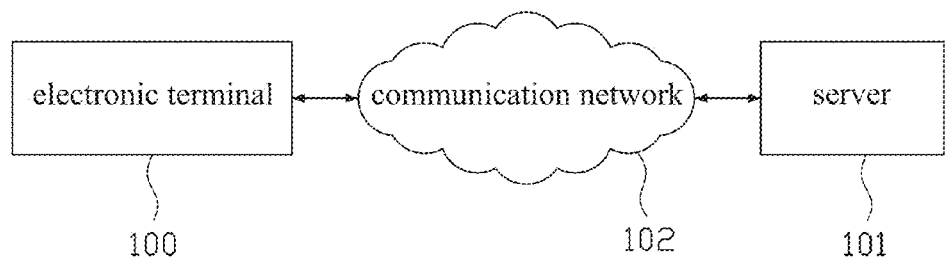
FIG. 1 illustrates a runtime environment according to various embodiments of the present disclosure.

The method for implementing augmented reality may be applied in an electronic terminal. FIG. 1 illustrates a runtime environment according to various embodiments of the present disclosure. The exemplary environment may include an electronic terminal 100, a server 101 and a communication network 102. The server 101 and the client 100 may be coupled through the communication network 102 for information exchange, such as sending/receiving identification information, sending/receiving data files such as splash screen images, etc. Although only one electronic terminal 100 and one server 101 are shown in the environment, any number of electronic terminals or servers may be included, and other devices may also be included.

The server 101, as used herein, may refer to one or more server computers configured to provide certain server functionalities, such as database management and search engines. The server 101 may include one or more processors to execute computer programs in parallel. In the present disclosure, the sever 101 may be a functional entity deployed by AR service providers for maintaining user preferences business relationships and orders, and according to user requests or business settings to deliver captured, augmented reality targets available for access to the electronic terminal 100, such as POI as well as augmented reality content, including text, images, audio, video and other multimedia information to provide users with augmented reality services.

The communication network 102 may include any appropriate type of communication network for providing network connections to the server 101 and the electronic terminal 100 or among multiple servers or clients. For example, communication network 102 may include the Internet or other types of computer networks or telecommunication networks, either wired or wireless. In a certain embodiment, the disclosed methods and apparatus may be implemented, for example, in a wireless network that includes at least one client.

The electronic terminals 100 in the present disclosure, such as desktop computers, notebook computers, smart phones, personal digital assistants, tablet PCs, etc., may install/run one or more smart operating system inside.

Figure 2:
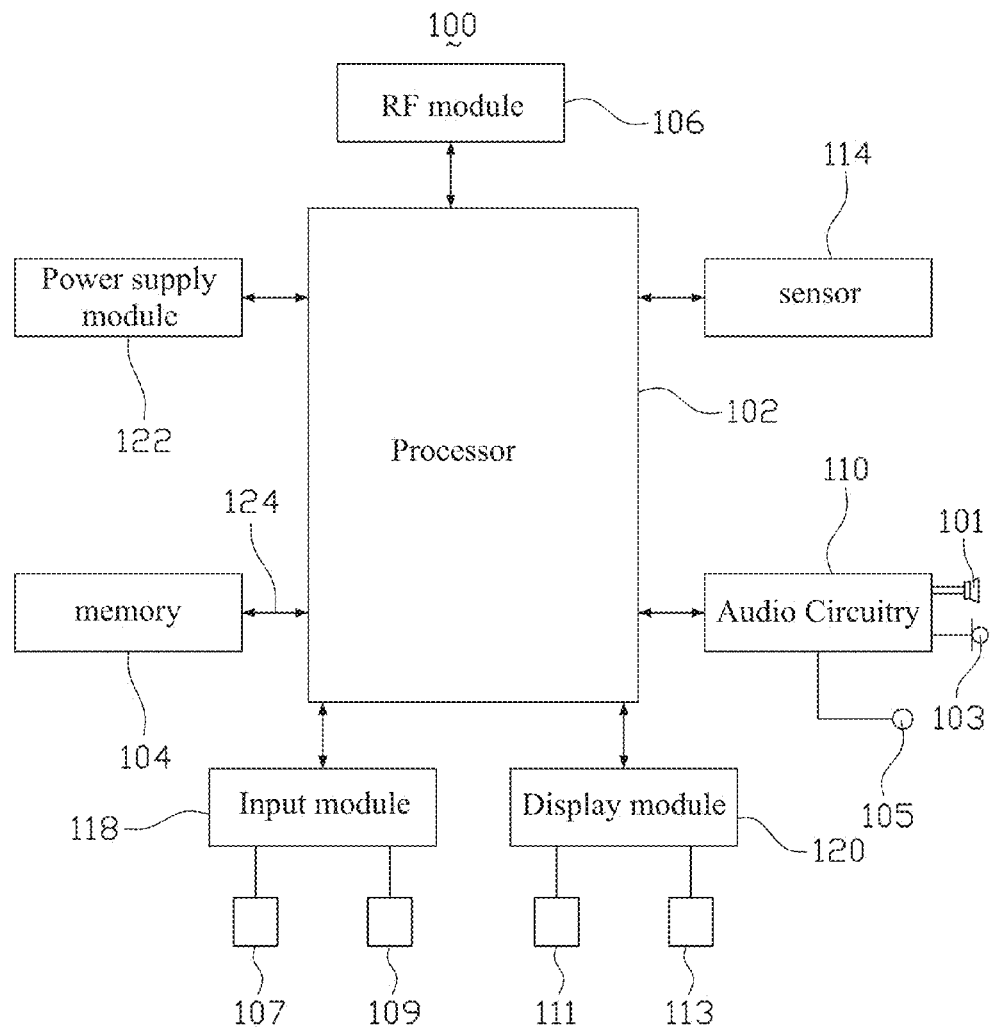
FIG. 2 is a block diagram of an example of electronic terminal.

FIG. 2 illustrates an electronic terminal example in the present disclosure. Referring to FIG. 2, the electronic terminal 100 includes one or more (only one in FIG. 1) processors 102, a memory 104, a Radio Frequency (RF) module 106, an Audio circuitry 110, a sensor 114, an input module 118, a display module 120, and a power supply module 122. A person skilled in the art will understand that the structure in FIG. 1 is shown for illustration purposes only, not limitations of the electronic terminal 100. For example, the electronic terminal 100 may also include more or less parts than FIG. 1 shows, or different configuration.

It can be understood by those skilled in the art that besides the processor 102, all other components are belong to peripheral. The processor 102 and the peripherals are coupled by many peripheral interfaces 124. Peripheral interfaces 124 may be implemented based on the following standards: Universal Asynchronous Receiver/Transmitter (UART), General Purpose Input Output (GPIO), Serial Peripheral Interface (SPI), Inter-Integrated Circuit (I2C), but not limited to the above standards. In some examples, the peripheral interfaces 124 may only include the bus; while in other examples, the peripheral interfaces 124 may also include other components, one or more controllers, for example, which may be a display controller for connecting a liquid crystal display panel or a storage controller for connecting storage. In addition, these controllers may also be separated from the peripheral interface 124, and integrated inside the processor 102 or the corresponding peripheral.

The memory 104 may be used to store software programs and modules, such as the program instructions/modules corresponding to the method and device of implementing augmented reality in the various embodiments of the present disclosure. The processor 102 performs a variety of functions and data processing by running the software program and the module stored in the memory 104, which implements the above method of processing virus in the electronic terminal in the various embodiments of the present disclosure. Memory 104 may include high-speed random access memory and nonvolatile memory, such as one or more magnetic storage devices, flash memory, or other non-volatile solid-state memory. In some examples, the memory 104 may further include a remote configured memory compared to the processor 102, which may be connected to the electronic terminal 100 via the network. The network instances include but not limited to, the Internet, intranets, local area network, mobile communication network, and their combinations.

The RF module 106 is used for receiving and transmitting electromagnetic waves, implementing the conversion between electromagnetic waves and electronic signals, and communicating with the communication network or other devices. The RF module 106 may include a variety of existing circuit elements, which perform functions, such as antennas, RF transceivers, digital signal processors, encryption/decryption chips, the subscriber identity module (SIM) card, memory, etc. The RF module 106 can communicate with a variety of networks such as the Internet, intranets, wireless network and communicate to other devices via wireless network. The above wireless network may include a cellular telephone network, wireless local area network (LAN) or metropolitan area network (MAN). The above wireless network can use a variety of communications standards, protocols and technologies, including but not limited to Global System for Mobile Communication (GSM), Enhanced Data GSM Environment (EDGE), wideband code division multiple access (W-CDMA), Code division access (CDMA), time division multiple access (TDMA), Wireless, Fidelity (WiFi) (such as the American Institute of Electrical and Electronics Engineers Association standards IEEE 802.11a, IEEE 802.11b, IEEE802.11g, and/or IEEE 802.11n), Voice over internet protocol (VoIP), Worldwide Interoperability for Microwave Access (Wi-Max), other protocols used for mail, instant messaging and short message, as well as any other suitable communication protocol, even including the protocols which are not yet been developed currently.

The Audio circuitry 110, the speaker 101, the audio jack 103, the microphone 105 together provide the audio interface between the user and the electronic device 100. Specifically, the audio circuit 110 receives audio data from the processor 102, converts the audio data into an electrical signal, and transmits the signal to the speaker 101. The speaker 101 converts the electrical signals to sound waves which can be heard by human ears. The audio circuitry 110 also receives electronic signals from the microphone, converts electronic signals to audio data, and transmits the audio data to the processor 102 for further processing. The audio data may also be acquired from the memory 104 or the RF module 106, the transmission module 108. In addition, the audio data may also be stored in the memory 104 or transmitted by the RF module 106 and the transmission module 108.

Examples of sensor 114 include but not limited to: an optical sensor, an operating sensor, and other sensors. Specifically, the optical sensor may include an ambient light sensor and a proximity sensor. The ambient light sensor may sense ambient light and shade, and then some modules executed by the processor 102 may use the output of the ambient light sensor to automatically adjust the display output. The proximity sensor may turn off the display output when detect the electronic device 100 near the ear. As a kind of motion sensor, gravity sensor may detect the value of acceleration in each direction, and the value and direction of gravity when the gravity sensor keeps still, which can be used for applications to identify the phone posture (such as horizontal and vertical screen switching, related games, magnetometer posture calibration), and for vibration recognition related functions (such as pedometer, percussion), etc. The electronic device 100 may also include a gyroscope, a barometer, a hygrometer, a thermometer, and other sensors, which is not shown for the purpose of brevity.

The input unit 118 may be configured to receive the input character information, and to generate input by keyboard, mouse, joystick, optical or trackball signal related to user settings and function control. Specifically, the input unit 130 may include button 107 and touch surface 109. The buttons 107 for example, may include character buttons for inputting characters, and control buttons for triggering control function. The instances of the control buttons may include a "back to the main screen" button, a power on/off button, an imaging apparatus button and so on. The touch surface 109 may collect user operation on or near it (for example, a user uses a finger, a stylus, and any other suitable object or attachment to operate on or near the touch surface 109), and drive the corresponding connecting device according to pre-defined program. Optionally, the touch surface 109 may include a touch detection device and a touch controller. The touch detection device detects users' touch position and a signal produced by the touch operation, and passes the signal to the touch controller. The touch controller receives touch information from the touch detection device, converts the touch information into contact coordinates, sends the contact coordinates to the processor 102, and receives and executes commands sent from the processor 102. In addition, the touch surface 109 may be implemented in resistive, capacitive, infrared, surface acoustic wave and other forms. Besides the touch surface 109, the input unit 118 may also include other input devices. The preceding other input devices include but not limited to, one or more physical keyboards, trackballs, mouse, joysticks, etc.

The display module 120 is configured to display the information input by users, the information provided to users, and a variety of graphical user interfaces of the electronic device 100. The graphical user interfaces may consist of graphics, text, icons, video, and any combination of them. In one example, the display module 120 includes a display panel 111. The display panel 111 may for example be a Liquid Crystal Display (LCD) panel, an Organic Light-Emitting Diode Display (OLED) panel, an Electro-Phoretic Display (EPD) panel and so on. Furthermore, the touch surface 109 may be on top of the display panel 111 as a whole. In other embodiments, the display module 120 may also include other types of display devices, such as a projection display device 113. Compared with the general display panel, the projection display device 113 needs to include a plurality of components for projection, such as a lens group.

The power supply module 122 is used to provide power for the processor 102 and other components. Specifically, the power supply module 122 may include a power management system, one or more power supplies (such as a battery or AC), a charging circuit, a power failure detection circuit, an inverter, a power status indicator, and any other components related to electricity generation, management and distribution within the electronic device 100.

Figure 3:
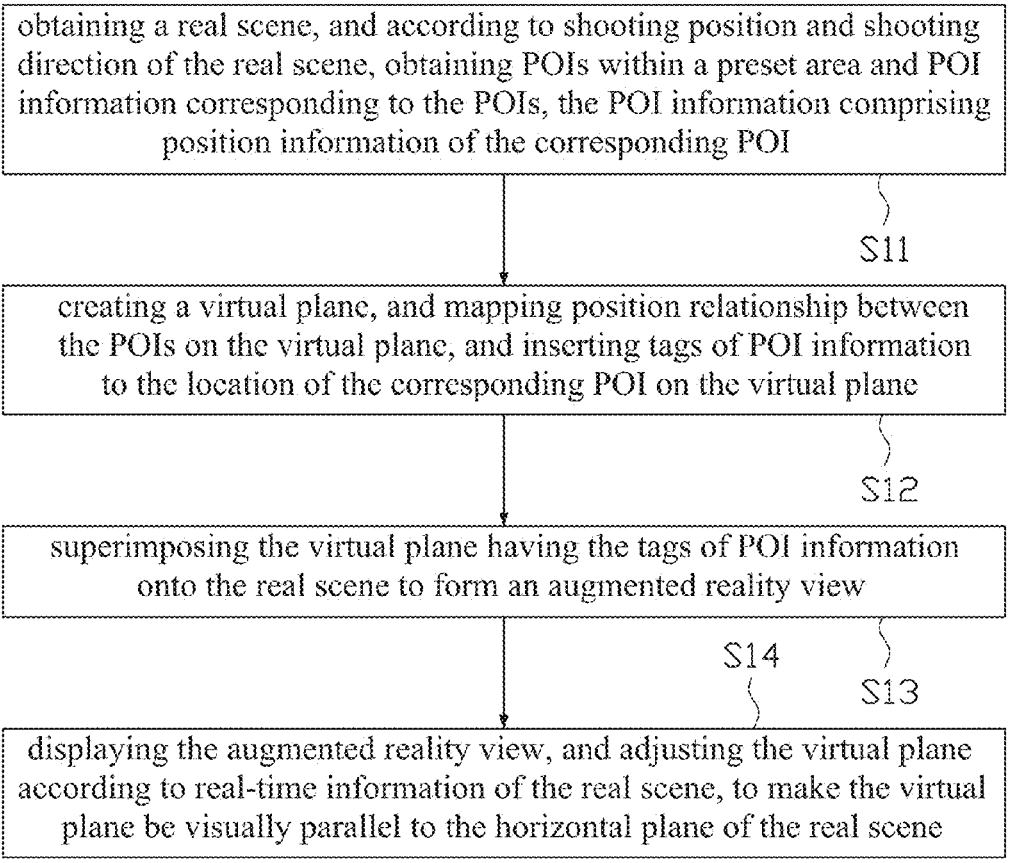
FIG. 3 is a flow chart of a method for implementing augmented reality provided by one embodiment of the present disclosure.

Referring to FIG. 3, which is a flow chart of a method for implementing augmented reality provided by one embodiment of the present disclosure. The method includes the following steps.

In Step 11, the electronic terminal obtains a real scene, and according to shooting position and shooting direction of the real scene, obtains POIs within a preset area and POI information corresponding to the POIs, wherein the POI information comprises position information of the corresponding POI.

The real scene refers to a real-time recording of the real physical world surrounding the user captured by the imaging apparatus of the electronic terminal 100 (e.g., smart phone). The real scene information may also be cached in the imaging apparatus.

The shooting position of the real scene may refer to the location information of the electronic terminal 100 captured by a GPS module in the electronic terminal 100, for example, longitude 116° 23'17", latitude: 39° 54'27".

The shooting direction may refer to the viewing direction of the imaging apparatus captured by a direction sensor in the electronic terminal 100, for example, a partial north east 15°.

Figure 4:
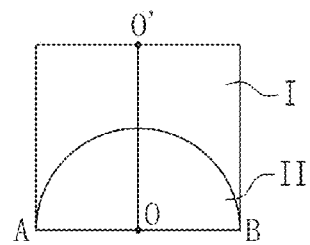
FIG. 4 is an illustration of the preset area in the FIG. 3.

The preset area in the exemplary embodiments may be a square area I or a semicircular area II as shown in FIG. 4. The shooting position of the real scene is the center of one border AB of the square area I or the semicircular area II, represented by the letter O in the FIG. 4. In FIG. 4, OO' represents the central axis of the square area I or the semicircular area II. The side of the square area I or the radius of the semicircular area II can be set according to actual needs, for example, 500 meters to 1000 meters or the like. Of course, the predetermined area can also be a rectangle or a fan-shaped area. The specific embodiments of the present disclosure are not limited thereto.

The electronic terminal 100 may obtain POIs and POI information corresponding to the POIs from the server 101, or directly obtain POIs and POI information corresponding to the POIs from application programming interface (API) the electronic map applications (such as Baidu map, soso map) etc. The specific embodiments of the present disclosure are not limited thereto. Associated with updating the database, the POI information may be updated in real time. The POI information may include name of the corresponding POI, geographic information, contact information, and the relevant text, images, audio, video and other multimedia information of the corresponding POI.

In Step 12, the electronic terminal creates a virtual plane, and maps position relationship between the POIs on the virtual plane, and inserts tags of POI information to the location of the corresponding POI on the virtual plane.

In the step, the electronic terminal creates a virtual plane. The virtual plane can be drawn using OpenGL. According to the location information of POIs, position relationship between the POIs on the virtual plane can be obtained. Then the position relationship between the POIs is mapped on the virtual plane. Preferably, the shape of the virtual plane can be obtained by reducing the preset area proportionally. Thus, the position relationship mapped on the virtual plane can be closer to the actual position relationship between these POIs in the physical world.

The tags of POI information are computer identifiable marking. In this step, tags of POI information to the location of the corresponding POI are inserted on the virtual plane. The specific form of the tags can be, but not limited to a text prompt box, or just a special shape graphic representation of computer identifiable marking. When users' mouse moves over on the tags, specific content of the tags will be displayed on the screen. The specific content of the tags may include POI information of the corresponding POI. In other words, when users' mouse moves over on the tags, specific content of the tags will be displayed on the screen.

In Step 13, the electronic terminal superimposes the virtual plane having the tags of POI information onto the real scene to form an augmented reality view.

According to the positional relationship between the POI, and the shooting position and shooting direction of the real scene, the electronic terminal superimposes the virtual plane having the tags of POI information onto the real scene to form an augmented reality view. Specifically, the direction of the virtual plane, when superimposed onto the real scene, can be determined by distance between the actual geographic location of the POIs and the shooting position. For example, one end having POIs relatively closing to the shooting position of the real scene can be set near the end of the augmented reality view closing to users, and the other end having POIs relatively far away from the shooting position of the real scene can be set far from the end of the augmented reality view closing to users.

After being superimposing, the virtual plane may be inclined at an angle, so that the virtual plane is visually parallel to the horizontal plane of the real scene. That is, from the users' vision, the virtual plane is coincident with or approximate parallel to the horizontal plane of the real scene. Therefore, the tags of POI information in the augmented reality view may have more dimensional sense and more sense of hierarchy, and may show the distance between the POIs and relative position relationship between the POI and uses intuitively.

In Step 14, the electronic terminal displays the augmented reality view, and adjusts the virtual plane according to real-time information of the real scene, to make the virtual plane be visually parallel to the horizontal plane of the real scene.

The electronic terminal displays the augmented reality view on the screen thereof to show it to users. In alternative embodiments, the augmented reality view can be displayed on another screen besides the screen of the electronic terminal 100, for example, a screen of a car monitor.

When users constantly change angle of the electronic terminal, the electronic terminal can obtain real time information of the real scene, including the shooting position, the shooting direction and the posture of the imaging apparatus in the electronic terminal to adjust the virtual plane, so that the virtual plane can be always visually parallel to the horizontal plane of the real scene.

In accordance with the embodiment, the electronic terminal creates a virtual plane, maps position relationship between the POIs on the virtual plane, inserts tags of POI information to the location of the corresponding POI on the virtual plane. Then the electronic terminal superimposes the virtual plane having the tags of POI information onto the real scene to form an augmented reality view, displays the augmented reality view, and adjusts the virtual plane according to real-time information of the real scene, to make the virtual plane be visually parallel to the horizontal plane of the real scene. Therefore, the tags of POI information in the augmented reality view final presented to the users have more dimensional sense and more sense of hierarchy, show the distance between the POIs and relative position relationship between the POI and uses intuitively, and improves the efficiency of the application of augmented reality.

Figure 5:
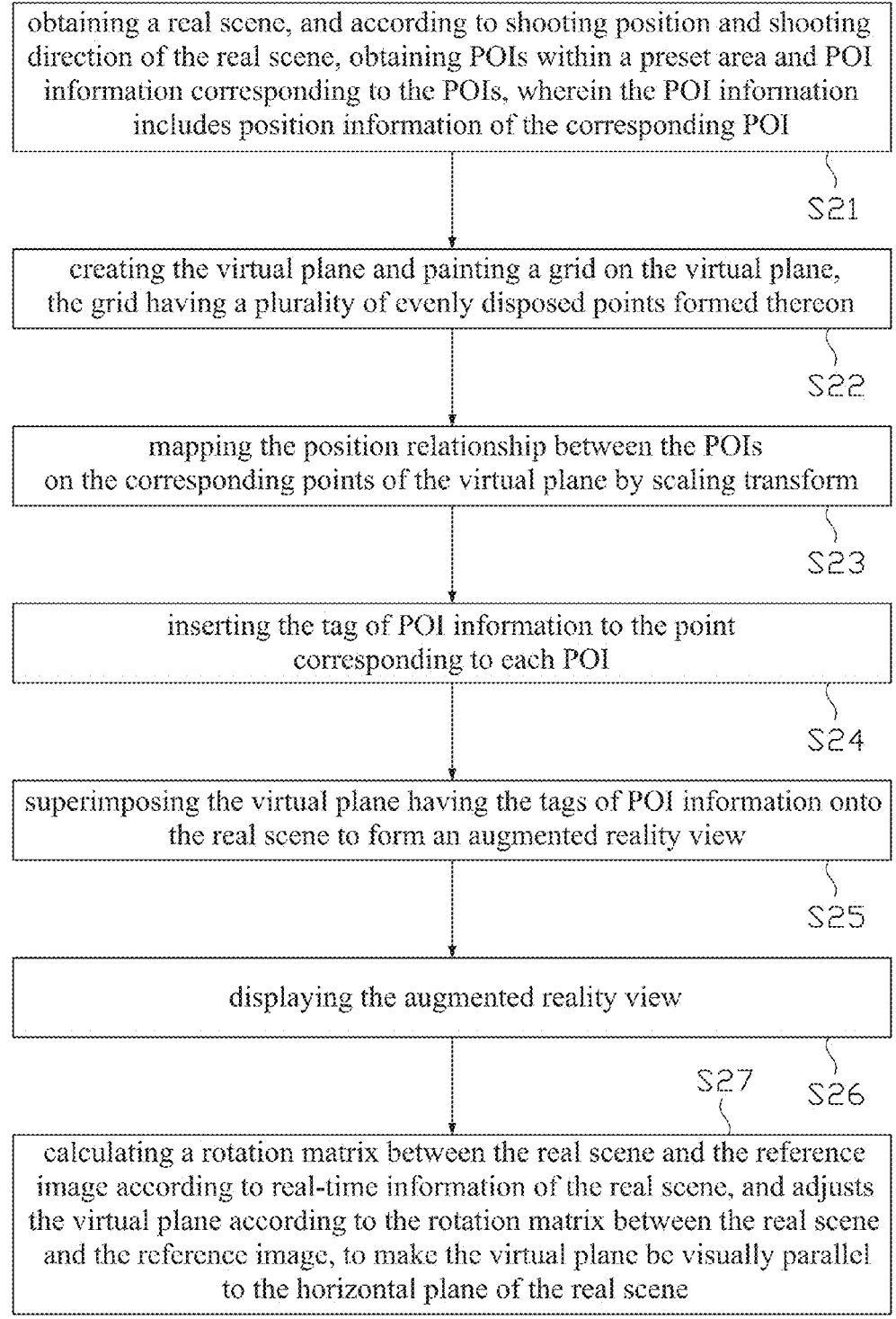
FIG. 5 is a flow chart of a method for implementing augmented reality provided by another embodiment of the present disclosure.

Referring to FIG. 5, which is a flow chart of a method for implementing augmented reality provided by another embodiment of the present disclosure. The method includes the following steps:

In Step 21, the electronic terminal obtains a real scene, and according to shooting position and shooting direction of the real scene, obtains POIs within a preset area and POI information corresponding to the POIs, wherein the POI information includes position information of the corresponding POI.

In Step 22, the electronic terminal creates the virtual plane and paints a grid on the virtual plane, the grid having a plurality of evenly disposed points formed thereon.

Assuming that, the virtual plane is in a square form, the grid painted on the virtual plane can have a plurality of evenly disposed points. Preferably, the plurality of points is arranged in an array, for example, the virtual plane may have a 50×50 grid pattern size, in other words, the virtual plane may have 50×50 points.

Furthermore, properties of the grid can be set in advance. The property of grid can be set as displaying the grid when the augmented reality view is displayed, which can enhance dimensional sense and sense of hierarchy of the virtual plane. The property of grid can also be set as hiding the grid when the augmented reality view is displayed.

In Step 23, the electronic terminal maps the position relationship between the POIs on the corresponding points of the virtual plane by scaling transform.

According to the location information of POIs, position relationship between the POIs on the virtual plane can be obtained. Then the position relationship between the POIs is mapped on the grid on the virtual plane. Thus, the position relationship mapped on the virtual plane can be closer to the actual position relationship between these POIs in the physical world.

In Step 24, the electronic terminal inserts the tag of POI information to the point corresponding to each POI.

In Step 25, the electronic terminal superimposes the virtual plane having the tags of POI information onto the real scene to form an augmented reality view.

Figure 6:
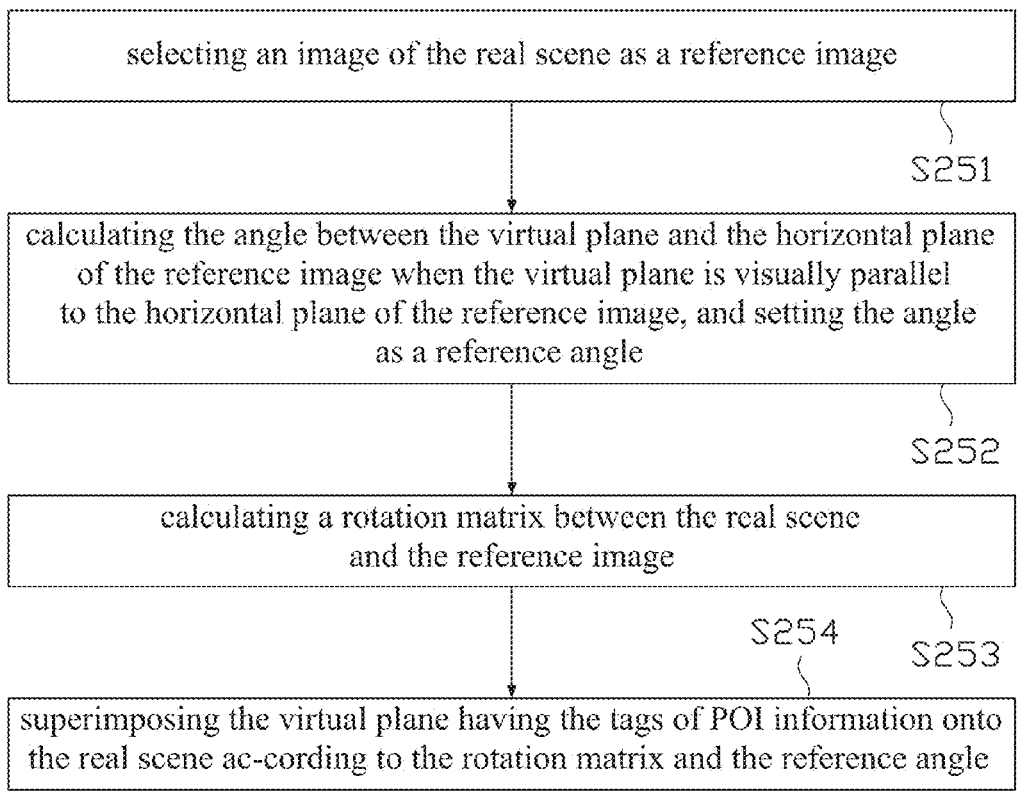
FIG. 6 is a flow chart of Step 25 in the FIG. 4.

Referring to FIG. 6, the Step 25 may include:

In Step 251, the electronic terminal selects an image of the real scene as a reference image.

In Step 252, the electronic terminal calculates the angle between the virtual plane and the horizontal plane of the reference image when the virtual plane is visually parallel to the horizontal plane of the reference image, and setting the angle as a reference angle.

In Step 253, the electronic terminal calculates a rotation matrix between the real scene and the reference image.

In Step 254, the electronic terminal superimposes the virtual plane having the tags of POI information onto the real scene according to the rotation matrix and the reference angle.

Before creating the virtual plane, the electronic terminal can create a Cartesian coordinate system firstly. For example, in the Cartesian coordinate system, the shooting position of real scene may be the origin point thereof, the direction of North Pole of the earth may be the positive direction of Y-axis thereof, the East direction of the earth may be the positive direction of X-axis thereof, and Z-axis thereof points to the sky. Assuming the selected reference image is an image of a real scene when user standing on the level ground (i.e., XOY plane) and taking the picture of the real scene in front of himself. The electronic terminal 100 calculates the angle (i.e., 15°) between the virtual plane and the horizontal plane (i.e., XOY plane) of the reference image when the virtual plane is visually parallel to the horizontal plane of the reference image. The angle is set as a reference angle. That is, from the users' vision, the feeling of watching the virtual reference is similar to 45-degree angle overlooking a horizontal plane.

Since during the process of obtaining the real scene, the imaging apparatus's posture is continuously changing, therefore, the virtual plane can not be directly superimposed onto the real scene according to the above reference angle. A rotation matrix between the real scene and the reference image needs to be considered.

Generally, the posture of the imaging apparatus includes translation, pitch, roll, and yaw. Each imaging apparatus in three-dimensional space has six degrees of freedom, which includes three translation freedom degrees X, Y, Z. In the three-dimensional space, the imaging apparatus can also have three angles of rotation. The yaw refers to rotation of the imaging apparatus about the Y axis, the pitch refers to rotation of the imaging apparatus about the X axis, the roll refers to rotation of the imaging apparatus about the Z axis.

Different posture of the imaging apparatus lead to differences between the captured images. Using the direction sensor the electronic terminal can obtain the degree of roll, yaw, and pitch of the real scene captured by the imaging apparatus, thereby calculating the rotation matrix between the real scene and the reference image. The rotation matrix presents space gesture relationship of the imaging apparatus at the time it captures reference image and at the time it captures each real scene. According to the rotation matrix and the reference angle, the electronic terminal superimposes the virtual plane having the tags of POI information onto the real scene to make the virtual plane be visually parallel to the horizontal plane of the real scene.

In Step 26, the electronic terminal displays the augmented reality view.

In Step 27, the electronic terminal calculates a rotation matrix between the real scene and the reference image according to real-time information of the real scene, and adjusts the virtual plane according to the rotation matrix between the real scene and the reference image, to make the virtual plane be visually parallel to the horizontal plane of the real scene.

Figure 7:
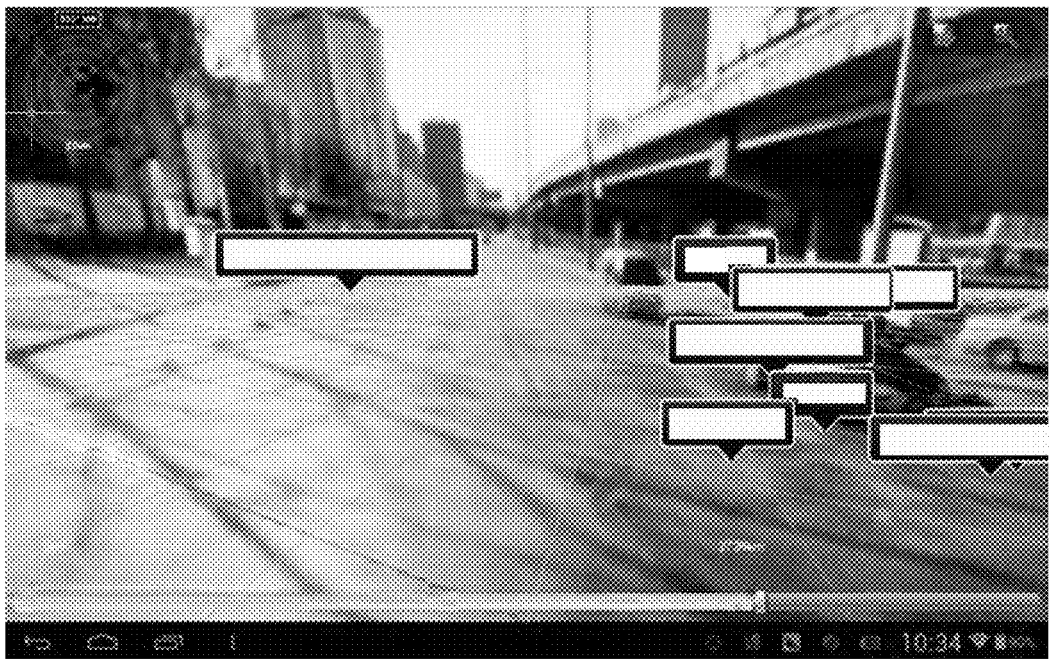
FIG. 7 is an illustration of the augmented reality view of the present disclosure.

The electronic terminal displays the augmented reality view on the screen thereof to show it to users. Users are possible to constantly change angle of the electronic terminal. At this time, the electronic terminal can calculate a rotation matrix between the real scene and the reference image according to real-time information of the real scene, and adjusts the virtual plane according to the rotation matrix between the real scene and the reference image, to make the grid on the virtual plane look like a ground plane to users. The virtual plane displayed on the screen will change with the viewing direction of the imaging apparatus, but always approximately parallel to the ground plane, as shown in FIG. 7, The tags of POI information corresponding to each POI within the preset area will emerge in the corresponding grid location, so it is easy to distinguish the distance between the tags for users. When the user turns the electronic terminal, the tags above the grid also rotate therewith. In addition, when the some tags cover some other tags, according to the user clicks on the screen, the electronic terminal can show the tags in a pop-up list form to the users to select a tag therefrom.

In accordance with the embodiment, the electronic terminal creates a virtual plane, maps position relationship between the POIs on the virtual plane, inserts tags of POI information to the location of the corresponding POI on the virtual plane. Then the electronic terminal superimposes the virtual plane having the tags of POI information onto the real scene to form an augmented reality view, displays the augmented reality view, and adjusts the virtual plane according to real-time information of the real scene, to make the virtual plane be visually parallel to the horizontal plane of the real scene. Therefore, the tags of POI information in the augmented reality view final presented to the users have more dimensional sense and more sense of hierarchy, show the distance between the POIs and relative position relationship between the POI and uses intuitively, and improves the efficiency of the application of augmented reality.

Figure 8:
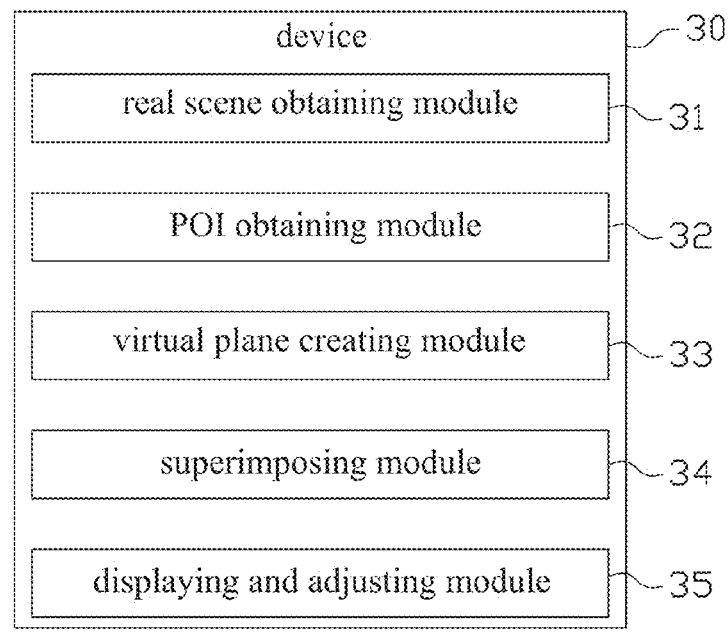
FIG. 8 is a block diagram of a device for implementing augmented reality according to one embodiment of the present disclosure.
Figure 9:
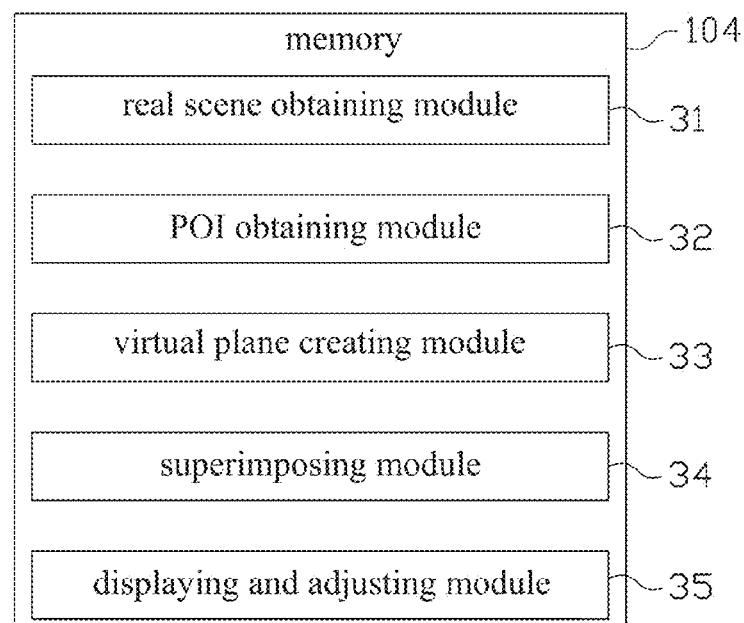
FIG. 9 is a schematic illustration of storage environment of the device illustrated in FIG. 8

FIG. 8 is a block diagram of a device for implementing augmented reality according to one embodiment of the present disclosure. Referring to FIG. 8, the device 30 may include a real scene obtaining module 31, a POI obtaining module 32, a virtual plane creating module 33, a superimposing module 34 and a displaying and adjusting module 35. The real scene obtaining module 31, the POI obtaining module 32, the virtual plane creating module 33, the superimposing module 34 and the displaying and adjusting module 35 may store in the memory 104, as shown in FIG. 9.

The real scene obtaining module 31 is configured to obtain a real scene. The POI obtaining module 32 is configured to obtain POIs within a preset area and POI information corresponding to the POIs according to shooting position and shooting direction of the real scene, the POI information comprising position information of the corresponding POI. The virtual plane creating module 33 is configured to create a virtual plane, and map position relationship between the POIs on the virtual plane, and insert tags of POI information to the location of the corresponding POI on the virtual plane. The superimposing module 34 is configured to superimpose the virtual plane having the tags of POI information onto the real scene to form an augmented reality view. The displaying and adjusting module 35 is configured to display the augmented reality view, and adjust the virtual plane according to real-time information of the real scene, to make the virtual plane be visually parallel to the horizontal plane of the real scene.

In accordance with the embodiment, the electronic terminal creates a virtual plane, maps position relationship between the POIs on the virtual plane, inserts tags of POI information to the location of the corresponding POI on the virtual plane. Then the electronic terminal superimposes the virtual plane having the tags of POI information onto the real scene to form an augmented reality view, displays the augmented reality view, and adjusts the virtual plane according to real-time information of the real scene, to make the virtual plane be visually parallel to the horizontal plane of the real scene. Therefore, the tags of POI information in the augmented reality view final presented to the users have more dimensional sense and more sense of hierarchy, show the distance between the POIs and relative position relationship between the POI and uses intuitively, and improves the efficiency of the application of augmented reality.

Figure 10:
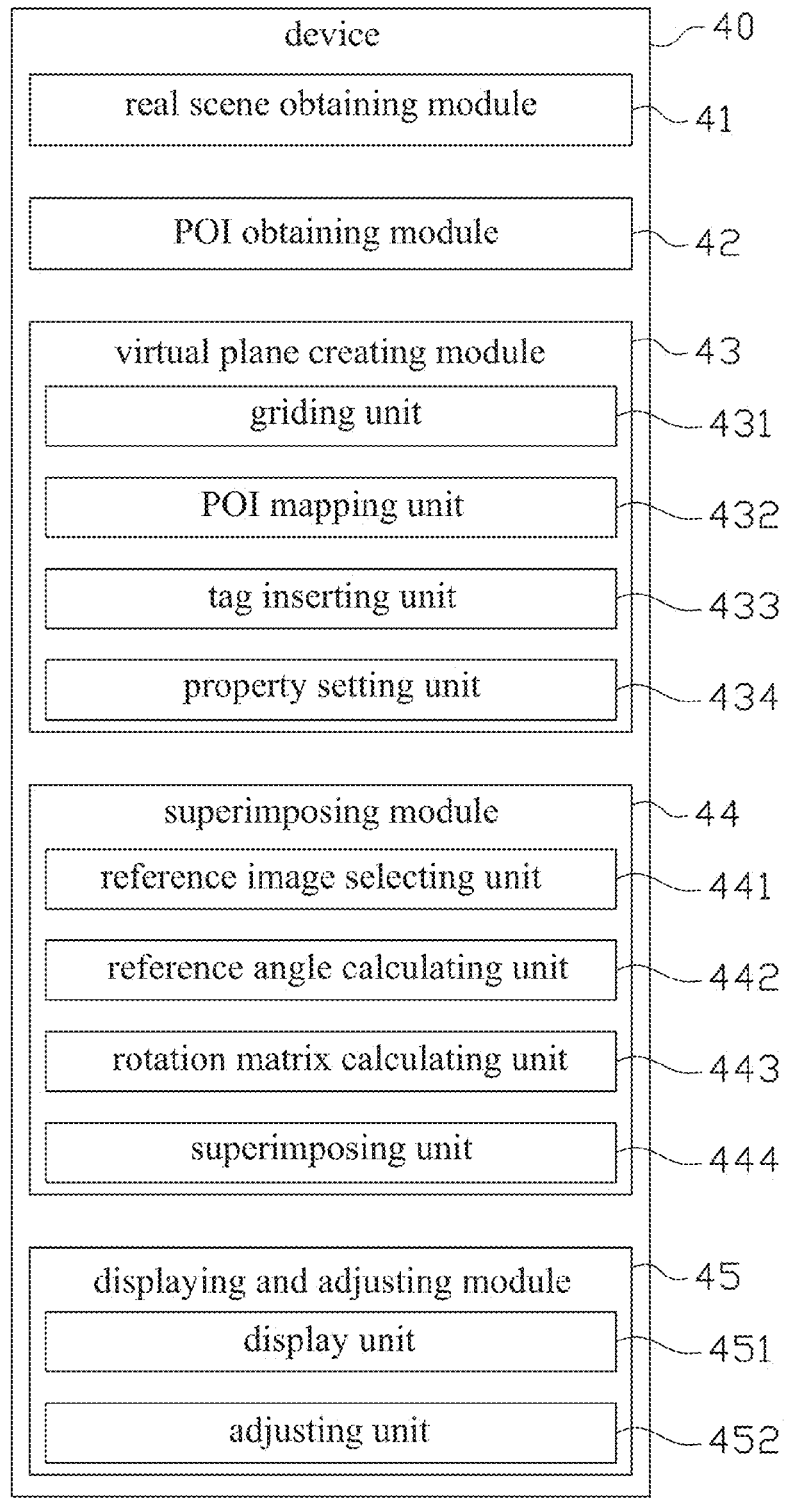
FIG. 10 is a block diagram of a device for implementing augmented reality according to another embodiment of the present disclosure.

FIG. 10 is a block diagram of a device for implementing augmented reality according to another embodiment of the present disclosure. Referring to FIG. 10, the device 40 may include a real scene obtaining module 41, a POI obtaining module 42, a virtual plane creating module 43, a superimposing module 44 and a displaying and adjusting module 45.

The real scene obtaining module 41 is configured to obtain a real scene. The POI obtaining module 42 is configured to obtain POIs within a preset area and POI information corresponding to the POIs according to shooting position and shooting direction of the real scene, the POI information comprising position information of the corresponding POI. The virtual plane creating module 43 is configured to create a virtual plane, and map position relationship between the POIs on the virtual plane, and insert tags of POI information to the location of the corresponding POI on the virtual plane. The superimposing module 44 is configured to superimpose the virtual plane having the tags of POI information onto the real scene to form an augmented reality view. The displaying and adjusting module 45 is configured to display the augmented reality view, and adjust the virtual plane according to real-time information of the real scene, to make the virtual plane be visually parallel to the horizontal plane of the real scene.

In this embodiment, the virtual plane creating module 43 may include a gridding unit 431, configured to create the virtual plane and paint a grid on the virtual plane, the grid having a plurality of evenly disposed points formed thereon, a POI mapping unit 432, configured to map the position relationship between the POIs on the corresponding points of the virtual plane by scaling transform; and a tag inserting unit 433, configured to insert the tag of POI information to the point corresponding to each POI.

The virtual plane creating module 43 may further include a property setting unit 434, configured to set properties of the grid, the properties comprise displaying the grid when the augmented reality view is displayed, and hiding the grid when the augmented reality view is displayed.

In this embodiment, the superimposing module 44 may includes a reference image selecting unit 441, configured to select an image of the real scene as a reference image, a reference angle calculating unit 442, configured to calculate the angle between the virtual plane and the horizontal plane of the reference image when the virtual plane is visually parallel to the horizontal plane of the reference image, and set the angle as a reference angle, a rotation matrix calculating unit 443, configured to calculate a rotation matrix between the real scene and the reference image; and a superimposing unit 444, configured to superimpose the virtual plane having the tags of POI information onto the real scene according to the rotation matrix and the reference angle.

In this embodiment, the displaying and adjusting module 45 may includes a display unit 451, configured to calculate a rotation matrix between the real scene and the reference image according to real-time information of the real scene; and an adjusting unit 452, configured to adjust the virtual plane according to the rotation matrix between the real scene and the reference image, to make the virtual plane be visually parallel to the horizontal plane of the real scene.

In accordance with the embodiment, the electronic terminal creates a virtual plane, maps position relationship between the POIs on the virtual plane, inserts tags of POI information to the location of the corresponding POI on the virtual plane. Then the electronic terminal superimposes the virtual plane having the tags of POI information onto the real scene to form an augmented reality view, displays the augmented reality view, and adjusts the virtual plane according to real-time information of the real scene, to make the virtual plane be visually parallel to the horizontal plane of the real scene. Therefore, the tags of POI information in the augmented reality view final presented to the users have more dimensional sense and more sense of hierarchy, show the distance between the POIs and relative position relationship between the POI and uses intuitively, and improves the efficiency of the application of augmented reality.

What's more, various devices provided by the embodiments of the disclosure discussed above is done for illustration purposes only, and should not be taken as limitations of the general principles of the device for processing virus in electronic terminal provided by the embodiment of the disclosure. It will be understood that various combinations and changes in the form and details of the device illustrated may be made by those skilled in the art without departing from the disclosure.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

The above descriptions are only preferred embodiments of the present disclosure, and are not intended to limit the present disclosure. Any amendments, replacement and modification made to the above embodiments under the spirit and principle of the present disclosure should be included in the scope of the present disclosure.

What is claimed is:

1. A method for implementing augmented reality, the method comprising:
    obtaining a real scene, and according to shooting position and shooting direction of the real scene, obtaining point of interests (POIs) within a preset area and POI information corresponding to the POIs, the POI information comprising position information of the corresponding POI;
    creating a virtual plane, and mapping position relationship between the POIs on the virtual plane, and inserting tags of POI information to the location of the corresponding POI on the virtual plane;
    selecting an image of the real scene as a reference image;
    calculating an angle between the virtual plane and a horizontal plane of the reference image when the virtual plane is visually parallel to the horizontal plane of the reference image, and setting the angle as a reference angle;
    calculating a rotation matrix between the real scene and the reference image;
    according to the rotation matrix and the reference angle, superimposing the virtual plane having the tags of POI information onto the real scene to form an augmented reality view; and
    displaying the augmented reality view, and adjusting the virtual plane according to real-time information of the real scene, to make the virtual plane be visually parallel to a horizontal plane of the real scene.

2. The method as claimed in claim 1, wherein, the step of creating a virtual plane, mapping position relationship between the POIs on the virtual plane, and inserting a tag of POI information to a location of the corresponding POI on the virtual plane, comprises:
    creating the virtual plane and painting a grid on the virtual plane, the grid having a plurality of evenly disposed points formed thereon;
    mapping the position relationship between the POIs on the corresponding points of the virtual plane by scaling transform; and
    inserting the tag of POI information to the point corresponding to each POI.

3. The method as claimed in claim 2, further comprising:
    setting properties of the grid, the properties comprising displaying the grid when the augmented reality view is displayed, and hiding the grid when the augmented reality view is displayed.

4. The method as claimed in claim 1, wherein, the step of displaying the augmented reality view, and adjusting the virtual plane according to real-time information of the real scene, to make the virtual plane be visually parallel to the horizontal plane of the real scene, comprises:
    according to real-time information of the real scene, calculating a rotation matrix between the real scene and the reference image; and
    according to the rotation matrix between the real scene and the reference image, adjusting the virtual plane, to make the virtual plane be visually parallel to the horizontal plane of the real scene.

5. A device for implementing augmented reality, the device comprising:
    one or more processors;
    a memory; and
    a plurality of modules stored in the memory and to be executed by the one or more processors, wherein the plurality of modules comprises:
        a real scene obtaining module, configured to obtain a real scene;
        a point of interest (POI) obtaining module, configured to obtain POIs within a preset area and POI information corresponding to the POIs according to shooting position and shooting direction of the real scene, the POI information comprising position information of the corresponding POI;
        a virtual plane creating module, configured to create a virtual plane, and map position relationship between the POIs on the virtual plane, and insert tags of POI information to the location of the corresponding POI on the virtual plane;
        a reference image selecting unit, configured to select an image of the real scene as a reference image;
        a reference angle calculating unit, configured to calculate an angle between the virtual plane and a horizontal plane of the reference image when the virtual plane is visually parallel to the horizontal plane of the reference image, and set the angle as a reference angle;
        a rotation matrix calculating unit, configured to calculate a rotation matrix between the real scene and the reference image;
        a superimposing unit, configured to superimpose the virtual plane having the tags of POI information onto the real scene to form an augmented reality view according to the rotation matrix and the reference angle; and
        a displaying and adjusting module, configured to display the augmented reality view, and adjust the virtual plane according to real-time information of the real scene, to make the virtual plane be visually parallel to a horizontal plane of the real scene.

6. The device as claimed in claim 5, wherein, the virtual plane creating module comprises:
    a gridding unit, configured to create the virtual plane and paint a grid on the virtual plane, the grid having a plurality of evenly disposed points formed thereon;
    a POI mapping unit, configured to map the position relationship between the POIs on the corresponding points of the virtual plane by scaling transform; and
    a tag inserting unit, configured to insert the tag of POI information to the point corresponding to each POI.

7. The device as claimed in claim 6, wherein, the virtual plane creating module further comprises:
    a property setting unit, configured to set properties of the grid, the properties comprise displaying the grid when the augmented reality view is displayed, and hiding the grid when the augmented reality view is displayed.

8. The device as claimed in claim 5, wherein, the displaying and adjusting module comprises:

a display unit, configured to calculate a rotation matrix between the real scene and the reference image according to real-time information of the real scene; and an adjusting unit, configured to adjust the virtual plane according to the rotation matrix between the real scene and the reference image, to make the virtual plane be visually parallel to the horizontal plane of the real scene.

9. A non-transitory computer-readable storage medium storing instructions for implementing augmented reality, the instructions comprising:

obtaining a real scene, and according to shooting position and shooting direction of the real scene, obtaining point of interests (POIs) within a preset area and POI information corresponding to the POIs, the POI information comprising position information of the corresponding POI;

creating a virtual plane, and mapping position relationship between the POIs on the virtual plane, and inserting tags of POI information to the location of the corresponding POI on the virtual plane;

selecting an image of the real scene as a reference image;

calculating an angle between the virtual plane and a horizontal plane of the reference image when the virtual plane is visually parallel to the horizontal plane of the reference image, and setting the angle as a reference angle;

calculating a rotation matrix between the real scene and the reference image; and according to the rotation matrix and the reference angle, superimposing the virtual plane having the tags of POI information onto the real scene to form an augmented reality view; and displaying the augmented reality view, and adjusting the virtual plane according to real-time information of the real scene, to make the virtual plane be visually parallel to a horizontal plane of the real scene.

10. The computer-readable storage medium as claimed in claim 9, wherein, the step of creating a virtual plane, mapping position relationship between the POIs on the virtual plane, and inserting a tag of POI information to a location of the corresponding POI on the virtual plane, comprises:

creating the virtual plane and painting a grid on the virtual plane, the grid having a plurality of evenly disposed points formed thereon;

mapping the position relationship between the POIs on the corresponding points of the virtual plane by scaling transform; and inserting the tag of POI information to the point corresponding to each POI.

11. The computer-readable storage medium as claimed in claim 10, further comprising:

setting properties of the grid, the properties comprising displaying the grid when the augmented reality view is displayed, and hiding the grid when the augmented reality view is displayed.

12. The computer-readable storage medium as claimed in claim 9, wherein, the step of displaying the augmented reality view, and adjusting the virtual plane according to real-time information of the real scene, to make the virtual plane be visually parallel to the horizontal plane of the real scene, comprises:

according to real-time information of the real scene, calculating a rotation matrix between the real scene and the reference image; and according to the rotation matrix between the real scene and the reference image, adjusting the virtual plane, to make the virtual plane be visually parallel to the horizontal plane of the real scene.

* * * * *